(12) United States Patent
Zakharoff (10) Patent No.: US 8,521,907 B2
(45) Date of Patent: *Aug. 27, 2013

(54) COMMUNICATIONS SYSTEM USING HIERARCHICAL QUEUE STRUCTURE FOR EMAIL MESSAGE DELIVERY AND RELATED METHODS

(75) Inventor: Michael Jack Zakharoff, Sumner, WA (US)

(73) Assignee: Teamon Systems, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/616,702

(22) Filed: Sep. 14, 2012

(65) Prior Publication Data

US 2013/0007176 A1    Jan. 3, 2013

Related U.S. Application Data

(63) Continuation of application No. 10/786,450, filed on Feb. 25, 2004, now Pat. No. 8,271,681.

(51) Int. Cl.
*G06F 15/173* (2006.01)
*G06F 15/16* (2006.01)

(52) U.S. Cl.
USPC .......... 709/239; 709/206; 709/207; 709/238; 709/240

(58) Field of Classification Search
USPC ........................................................ 709/239
See application file for complete search history.

(56) References Cited

U.S. PATENT DOCUMENTS

| | | | | |
|---|---|---|---|---|
| 5,144,293 | A * | 9/1992 | Rouse | 340/2.81 |
| 5,632,011 | A * | 5/1997 | Landfield et al. | 709/206 |
| 6,282,565 | B1 * | 8/2001 | Shaw et al. | 709/206 |
| 6,574,770 | B1 * | 6/2003 | Daudelin | 714/776 |
| 6,675,215 | B1 * | 1/2004 | Cedola | 709/227 |
| 6,941,304 | B2 * | 9/2005 | Gainey et al. | 1/1 |
| 7,085,812 | B1 * | 8/2006 | Sherwood | 709/206 |
| 7,505,974 | B2 * | 3/2009 | Gropper | 1/1 |
| 7,536,704 | B2 * | 5/2009 | Pierre et al. | 725/58 |
| 2002/0046250 | A1 * | 4/2002 | Nassiri | 709/206 |
| 2002/0049610 | A1 * | 4/2002 | Gropper | 705/1 |
| 2002/0133618 | A1 * | 9/2002 | Desai et al. | 709/238 |

(Continued)

OTHER PUBLICATIONS

"Cisco Email Manager Version 4.0.5i Product Bulletin", 1992-2003, available at www.cisco.com/en/US/products/sw/custcosw/ps840/prod_bulletin09186a00800e42b9.html, pp. 1-4.

(Continued)

*Primary Examiner* — Richard G Keehn
(74) *Attorney, Agent, or Firm* — Allen, Dyer, Doppelt, Milbrath & Gilchrist, P.A.

(57) ABSTRACT

A communications system may include at least one destination server for hosting email message boxes, and communications devices for generating email messages each associated with a respective message box. A delivery server may have a plurality of queues and a controller. The controller may store the email messages in a first queue, and attempt to send the stored email messages to the destination server at a first sending rate. The controller may also move email messages stored in the first queue to a second queue based upon a delivery failure. Email messages may be sent from the second queue at a second sending rate less than the first sending rate. The controller may also move email messages from the second queue to the first queue having a common characteristic with a successfully delivered email message.

23 Claims, 4 Drawing Sheets

(56) References Cited

U.S. PATENT DOCUMENTS

| | | | |
|---|---|---|---|
| 2003/0061287 A1* | 3/2003 | Yu et al. | 709/205 |
| 2003/0101099 A1* | 5/2003 | Sheltz et al. | 705/26 |
| 2003/0115022 A1* | 6/2003 | Hamilton et al. | 702/188 |
| 2003/0145106 A1* | 7/2003 | Brown | 709/238 |
| 2004/0011866 A1* | 1/2004 | Saad | 235/380 |
| 2004/0215472 A1* | 10/2004 | Gleckman | 705/1 |
| 2004/0236966 A1* | 11/2004 | D'Souza et al. | 713/201 |
| 2005/0055407 A1* | 3/2005 | Tandler et al. | 709/206 |
| 2005/0063005 A1* | 3/2005 | Phillips et al. | 358/1.15 |
| 2005/0091318 A1* | 4/2005 | Keohane et al. | 709/206 |
| 2005/0108208 A1* | 5/2005 | Aoki | 707/3 |
| 2005/0114453 A1* | 5/2005 | Hardt | 709/206 |
| 2005/0204002 A1* | 9/2005 | Friend | 709/206 |
| 2007/0005970 A1* | 1/2007 | Trupp et al. | 713/170 |
| 2007/0203994 A1* | 8/2007 | McCarthy et al. | 709/206 |

OTHER PUBLICATIONS

"Sendmail High Volume Mail Solution", 2003 Sendmail Inc., available at www.sendmail.com, pp. 1-2.

McGrail, "[Mimedefang] re: Qtool vs. re-mqueue (was Spillover queue)", Aug. 2003, available at http://lists.roaringpenguin.com/pipermail/mimedefang/2003-August/007255.html, p. 1.

McGrail, "Implementing a Spillover Host Concept on RedHat", Nov. 2003, available at www.peregrinehw.com/downloads/sendmail/current-8.12.X/untarred/contrib/slowqueue, pp. 1-2.

* cited by examiner

COMMUNICATIONS SYSTEM USING HIERARCHICAL QUEUE STRUCTURE FOR EMAIL MESSAGE DELIVERY AND RELATED METHODS

RELATED APPLICATIONS

This application is a continuation of pending Ser. No. 10/786,450 filed Feb. 25, 2004, the entire disclosure of which is hereby incorporated herein by reference.

FIELD OF THE INVENTION

The present invention relates to the field of communications systems, and, more particularly, to electronic mail (email) systems and related methods.

BACKGROUND OF THE INVENTION

In an email system, email messages are typically generated by users on communications devices such as personal computers (PCs), personal data assistants (PDAs), etc. Once generated, these messages are forwarded to an email delivery server which hosts the users' email accounts. For example, in a corporate environment, a user's communications device may be connected to an email delivery server via a local area network (LAN), while home users may connect to a delivery server of an Internet service provider (ISP) via a dial-up or broadband communications link.

The email delivery server temporarily stores the email messages in a queue for processing and sending to the destination message box (or boxes) associated with the email message. The destination message box is designated by the recipient address the user includes with the email. Presuming that a recipient's message box is not hosted on the email delivery server, the email messages are forwarded via a wide area network (WAN) (e.g., the Internet) to a destination server at which the recipient message box is hosted. The email address associated with the message also designates the appropriate destination server. Once the destination server receives an email message, it stores the email message in the intended recipient's message box.

Sometimes problems arise during this email delivery process. Perhaps the most frequent of these problems is that a recipient's message box is full, in which case the destination server is unable to store new email messages in the message box. In such case, the destination server will typically generate a fatal error message, which is returned to the email delivery server to indicate that the message has not been delivered. Another potential problem is that the destination server is down or otherwise unavailable. In this case, an intermediate server or routing device will generate a temporary failure message, which is also returned to the email delivery server.

The email delivery server sends email messages stored in its queue at a predetermined sending rate (every few minutes, etc.). When a large number of mail delivery failures occur, the queue begins to fill up as users continue to generate more and more messages and the undelivered messages remain in the queue. Not only does this consume large amounts of storage space, but it also consumes significant processing resources as the email delivery server will repeatedly try to send the messages until it no longer receives a failure message.

One prior art approach to alleviating this problem is to implement a secondary queue at the email delivery server, which is sometimes referred to as a spillover or fallback queue. When a delivery failure is received for a particular email message stored in the delivery server's primary queue, the email message is then moved to the secondary queue. The email delivery server may then attempt to send messages stored in the secondary queue at a lower sending rate than the primary queue. This helps conserve system resources in that the email delivery server is not spending as much time trying to re-send the failed messages, and it does not have to access the primary queue as often. Two examples of email server systems which use secondary queues are the Sendmail High Volume Mail Solution (HVMS), and Cisco System's E-mail Manager.

Despite the advantages of such systems, additional flexibility for managing primary and secondary queues of email delivery servers may be desirable in certain applications.

SUMMARY OF THE INVENTION

In view of the foregoing background, it is therefore an object of the present invention to provide a communications system which provides enhanced email queue management features and related methods.

This and other objects, features, and advantages in accordance with the present invention are provided by a communications system which may include at least one destination server for hosting a plurality of electronic mail (email) message boxes, and a plurality of communications devices for generating email messages each associated with a respective message box. The system may further include a delivery server including a plurality of queues and a controller.

More particularly, the controller may be for storing the email messages generated by the communications devices in a first queue, and attempting to send the stored email messages to the at least one destination server at a first sending rate. The controller may also move email messages stored in the first queue to a second queue based upon a delivery failure. The controller may then attempt to send email messages stored in the second queue to the at least one destination server at a second sending rate less than the first sending rate. The controller may also advantageously move email messages from the second queue to the first queue having a common characteristic with a successfully delivered email message.

By way of example, the delivery failures may be based upon a failure to deliver email messages to respective message boxes, and the common characteristic may thus be a common message box. Moreover, the at least one destination server may be a plurality of destination servers. Accordingly, the delivery failures may be based upon a failure to deliver email messages to respective destination servers, and the common characteristic may be that the email messages have respective message boxes hosted by a common destination server. Thus, the controller advantageously moves email messages to the first queue for quicker delivery to the appropriate destination server once it has been determined that the destination server or message box is able to receive email messages.

Furthermore, the controller may store directly in the second queue email messages generated by the communications devices which share the common characteristic with an email message already stored in the second queue. Thus, for example, if a new message is received from a communications device that has the same destination server and/or message box associated therewith as a message already moved to the second queue, then the message may be stored directly in the second queue. That is, since it is already known that attempts to send email messages to the destination server and/or message box in question have previously failed, there is no need to fill the first queue with a new message whose delivery will most likely fail for the same reason.

The second queue may also be a plurality thereof arranged in a hierarchy each having a respective storage interval associated therewith. Further, the storage intervals may successively increase from a highest queue in the hierarchy to a lowest queue. The controller may thus move email messages to one of the queues in the hierarchy (e.g., the highest queue) based upon a delivery failure. Also, the controller may move email messages stored in a higher queue in the hierarchy to a next lower queue in the hierarchy after being stored in the higher queue for the respective storage interval thereof. Moreover, the controller may attempt to send messages from each of the queues in the hierarchy at successively decreasing sending rates from the highest queue to the lowest queue. Further, the controller may discard messages from the lowest queue in the hierarchy after being stored therein for the storage interval thereof.

By way of example, one or more of the plurality of communications devices may be a wireless communications device. Also, the communications system may further include a wide area network (WAN), such as the Internet, connecting the at least one destination server and the delivery server.

An email communications method aspect of the invention may include hosting a plurality of email message boxes on at least one destination server, and generating email messages each associated with a respective message box. The method may further include storing the email messages in a first queue, and attempting to send the stored email messages to the at least one destination server at a first sending rate. Additionally, email messages stored in the first queue may be moved to a second queue based upon a delivery failure thereof. The method may also include attempting to send email messages stored in the second queue to the at least one destination server at a second sending rate less than the first sending rate, and moving email messages from the second queue to the first queue having a common characteristic with a successfully delivered email message.

Other advantageous aspects of the invention relate to a delivery server, such as the one described briefly above, and a related computer-readable medium.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternate embodiments.

Figure 1:
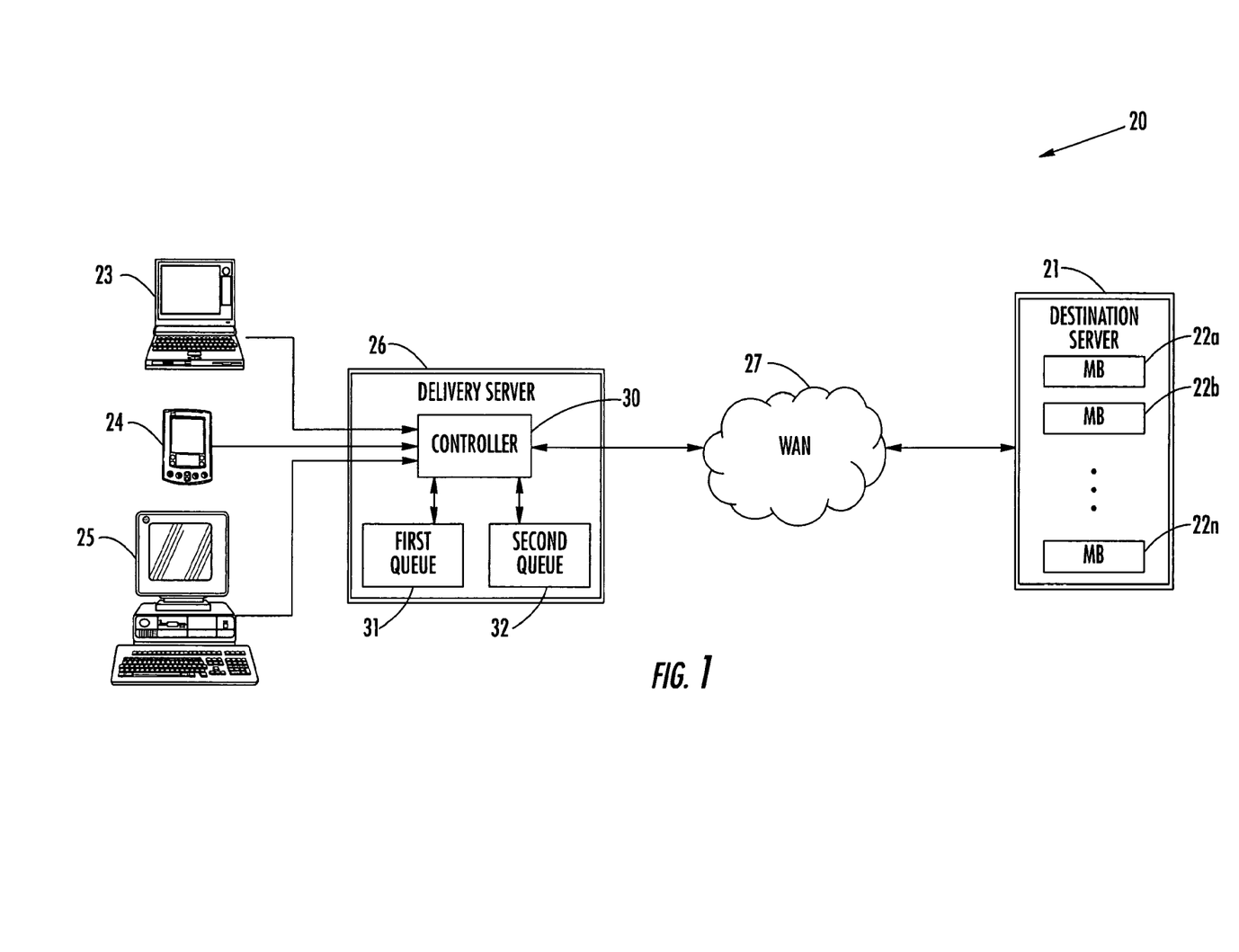
FIG. 1 is a schematic block diagram of a communications system in accordance with the present invention.

Referring initially to FIG. 1, a communications system 20 in accordance with the present invention illustratively includes a destination server 21 for hosting a plurality of email message boxes (MB) 22a-22n. While only a single destination server 21 is shown in the illustrated example for clarity of illustration, it will be appreciated by those skilled in the art that numerous destination servers may be used, as will be discussed further below. Further, the system 20 also illustratively includes a plurality of communications devices 23-25 for generating email messages each associated with a respective one of the message boxes 22a-22n. By way of example, the communications devices 23-25 may be laptop computers, personal data assistants (PDAs), and desktop personal computers (PC), as illustratively shown. Other suitable devices for generating emails may also be used, as will be appreciated by those skilled in the art.

A delivery server 26 receives the emails from the communications devices 23-25 and sends them to the destination server 21. In the illustrated example, the delivery server 26 and destination server 21 communicate via a wide area network (WAN) 27, such as the Internet, for example. The communications devices 23-25 may be connected with the delivery server 26 in a local area network (LAN), for example, including a wireless LAN (WLAN) in some embodiments, as will be appreciated by those skilled in the art.

In particular, the delivery server 26 illustratively includes a controller 30, a first (or primary) queue 31, and a second queue 32. The controller 30 stores the email messages generated by the communications devices 23-25 in the first queue 31. The controller 30 then attempts to send the email messages stored in the first queue 31 to the destination server 21 at a first sending rate. Typically, messages will be sent from the first queue 31 at a relatively fast rate, such as every few minutes or less. The controller 30 may be implemented as a software module which runs on the delivery server 26, and the queues 31, 32 may be implemented as database modules, for example.

Once received by the destination server 21, the destination server delivers the email messages to their respective message boxes 22a-22n. As will be appreciated by those skilled in the art, an address is associated with an email message when it is generated. The address identifies the message box 22 for which the message is intended, as well as the destination server 21 hosting the message box. Depending upon a given implementation, the destination server 21 may return a confirmation indication to the delivery server 26 to indicate that an email message has been successfully delivered to the appropriate mailbox 22.

Yet, as discussed above, it is not uncommon for email message delivery to fail for a variety of different reasons. By way of example, message boxes 22a-22n hosted on a corporate or Internet service provider's (ISP's) server will typically be allotted a limited amount of storage space. If a user does not empty his respective message box 22, he will eventually exceed his allotted storage space, and the delivery server 21 will then stop storing messages for that user until space is once again made available. If a message box 22 is full and a new message arrives at the destination server 21 for this message box, the destination server will return a failure message to the delivery server 26. By way of example, a failure message resulting from a full mailbox may take the form of a fatal error data source name (DSN) code, as will be appreciated by those skilled in the art.

Another reason for a delivery failure may be that the destination server 21 is down or otherwise unavailable. In this case, a server or other routing device within the WAN 27 may generate a failure message for the delivery server 26 letting it know that the destination server 21 is unavailable. For example, the delivery server 26 may receive a temporary failure DSN code in such an event.

When the controller 30 receives one of the above types of delivery failure messages (or others) for a given email message, the controller then advantageously moves the message to the second queue 32. This promotes system resource savings in several ways. First, the controller attempts to send email messages stored in the second queue 32 to the destination server 21 at a second sending rate less than the first sending rate. Thus, the controller 30 does not have to devote as much time to re-sending these messages as it otherwise would if they were still in the first queue 31. Moreover, the second queue may be stored within a different directory or location of the delivery server 26. Thus, the number of operations that require access to the first queue 31 at any given time is reduced, which helps reduce bottlenecks, as will be appreciated by those skilled in the art.

In accordance with the invention, the controller 30 may also advantageously move email messages from the second queue 32 to the first queue 31 having a common characteristic with a successfully delivered email message. More particularly, if an email message had been moved to the second queue 32 because its respective message box 22 was full, the successful delivery of another email message to that same message box would indicate to the controller 30 that the message box was again able to receive messages. Accordingly, the controller 30 would move the email message from the second queue 32 to the first queue 31 so that it would be delivered more quickly to the given message box 22.

Figure 2:
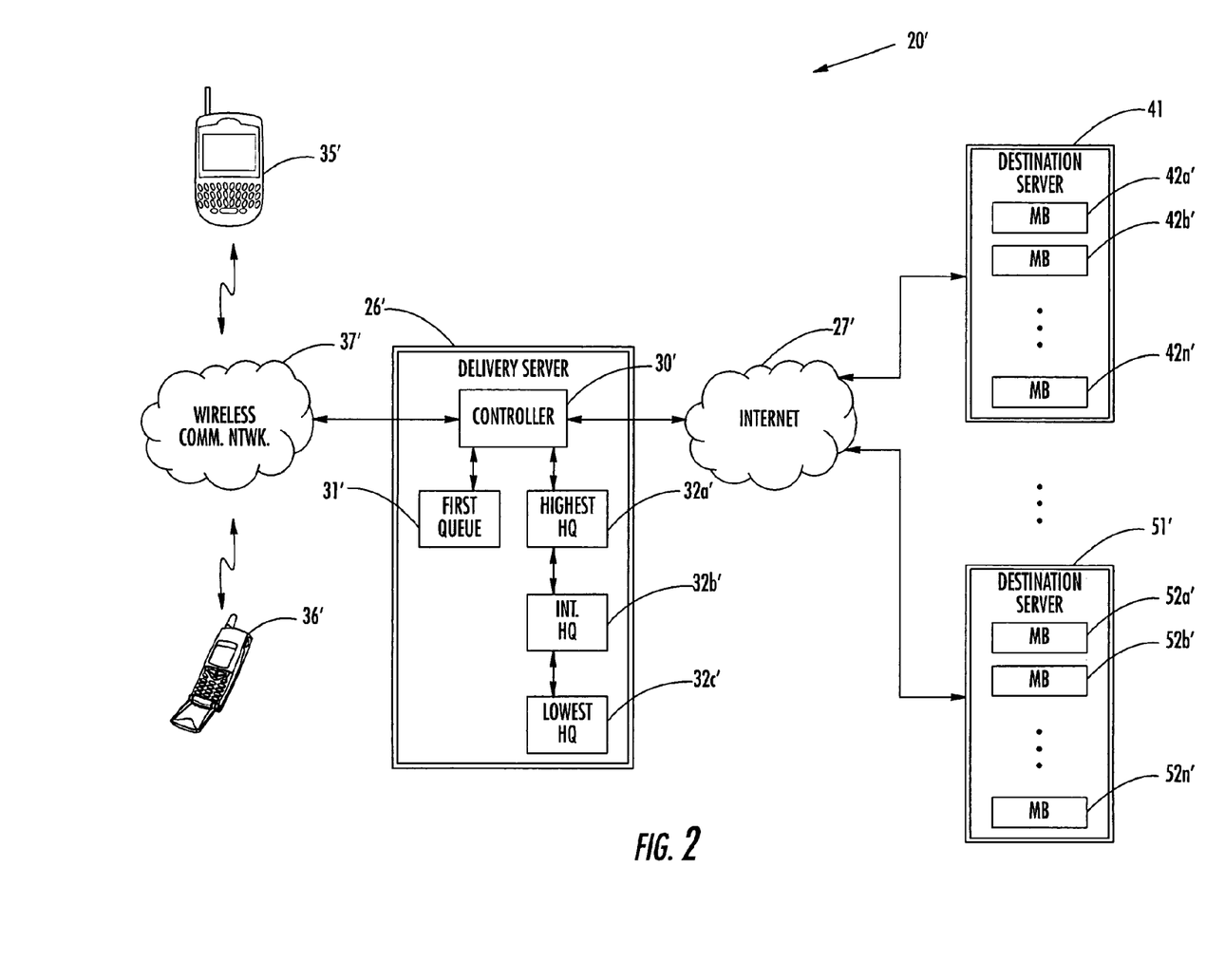
FIG. 2 is a schematic block diagram of an alternate embodiment of the communications system of FIG. 1.

Similarly, if the delivery failure is a result of a destination server 21 failure, then the controller 30 may then move email messages which were stored in the second queue 32 because of the destination server's unavailability to the first queue 31 once it is determined that the destination server is once again available. This embodiment is particularly advantageous where there are numerous destination servers 41', 51' for which delivery failure messages may be received, as shown in FIG. 2. In this exemplary embodiment, the destination servers 41', 51' and their respective messages boxes 42a'-42n', 52a'-52n' are similar to the destination server 21 and messages boxes 22a-22n noted above.

Moreover, in the present embodiment the delivery server 26' communicates with wireless communications devices 35', 36' via a wireless communications network 37'. By way of example, the wireless communications network 37' may be a cellular network, and the wireless communications devices 35', 36' may be cellular-based email devices such as Blackberry devices or email ready cellular telephones, as shown.

To provide still further efficiencies, the single second queue 32 described above has been replaced in the present embodiment with a plurality of queues 32a'-32c' arranged in a hierarchy (HQs), as shown. Here, the queue 32a' is the highest queue in the hierarchy, the queue 32b' is the intermediate queue, and the queue 32c' is the lowest queue. Each queue 32a'-32c' has a respective storage interval associated therewith, and these intervals successively increase from the highest queue 32a' to the lowest queue 32c'.

Thus, when an email message has been stored in a given one of the queues 32a'-32c' for the respective storage interval thereof, the controller 30' moves the email message to the next lower queue in the hierarchy. This helps further relieve congestion over the use of a single second queue, as email messages are then distributed over multiple queues instead of all collecting in one. Of course, the number of queues used in a given hierarchical implementation will vary depending upon the email message volume being handled and other considerations, as will be appreciated by those skilled in the art.

One exemplary embodiment would be to include seven second queues which respectfully store email messages up to intervals of one hour, two hours, four hours, eight hours, twelve hours, twenty-four hours, and forty-eight hours after they are received by the controller 30'. Once an email message has remained in the lowest queue in the hierarchy for the storage interval thereof, the controller 30' may discard the message, for example. Of course, other actions could be taken, such as notifying the user who generated the email message of its failure to be delivered, etc., as will be appreciated by those skilled in the art.

The controller 30' may also attempt to send messages from each of the queues 32a'-32c' at successively decreasing sending rates from the highest queue 32a' to the lowest queue 32c'. Accordingly, the email messages do not have to be processed as often once they are moved to a next lower queue in the hierarch, as discussed above. Various sending rates may be used based upon the given implementation.

In accordance with another particularly advantageous feature of the invention, the controller 30' may store directly in any one of the queues 32a'-32c' email messages generated by the communications devices 35', 36'. This would be done when such messages share a common destination server 41', 51' and/or message box 42', 52' with an email message already stored in one of the queues 32a'-32c', where such destination server or message box was the reason for the unsuccessful delivery of the stored message.

Thus, for example, if a new message is received from the communications device 35' that has the same destination server and/or message box associated therewith as a message already in one of the queues 32a-32b', then the message is stored directly in one of these queues. This could be the highest queue 32a', or the same queue in which the email message with the common characteristic is already stored, for example.

It should be noted that rather than restoring a message to the first queue 31' after a successful delivery of another email message having a common characteristic therewith, as described above, the message could instead be moved to another in the hierarchy (or other queue), if desired. Moreover, the controller 30' could check multiple common characteristics (e.g., server failure, message box failure, etc.) in determining whether to move email messages to the first queue 31'. Thus, for example, if it was determined that a given delivery server was once again available, the controller 30' may move all email messages stored in the queues 32a'-32c' to the first queue 31', except those for which delivery failed because of a message box delivery failure. Also, the successful delivery of a message need not be from the first queue 31', but it could be from any of the queues 32a'-32c' as well.

Figure 3:
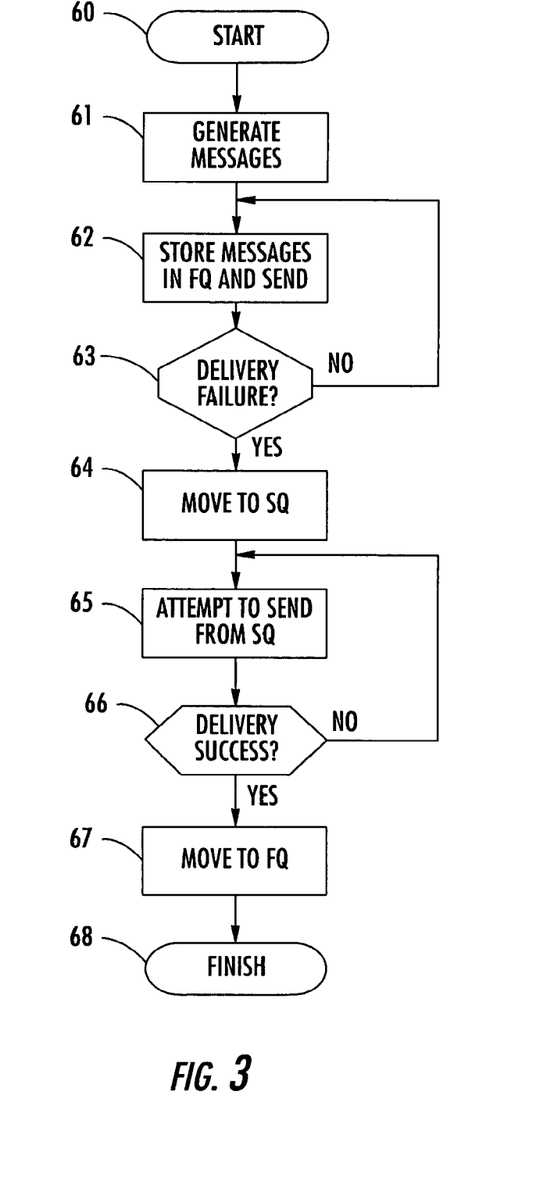
FIG. 3 is flow diagram illustrating an email communications method in accordance with the present invention.

An email communications method aspect of the invention will now be described with reference to FIG. 3. Beginning at Block 60, email messages are generated by the communications devices 23-25 (Block 61), each of which is associated with a respective message box 22a-22n. The email messages are stored in the first queue 31 (FQ) and an attempt is made to the destination server 21 at a first sending rate, at Block 62. Additionally, email messages stored in the first queue 31 are moved to the second queue 32 (SQ) based upon a delivery failure, at Blocks 63-64.

The method further illustratively includes attempting to send email messages stored in the second queue 32 to the destination server 21 at a second sending rate less than the first sending rate, at Block 65. Further, email messages are moved from the second queue 32 to the first queue 31 having a common characteristic with a successfully delivered (Block 66) email message, at Block 67, as discussed above, thus concluding the illustrated method (Block 68).

Figure 4:
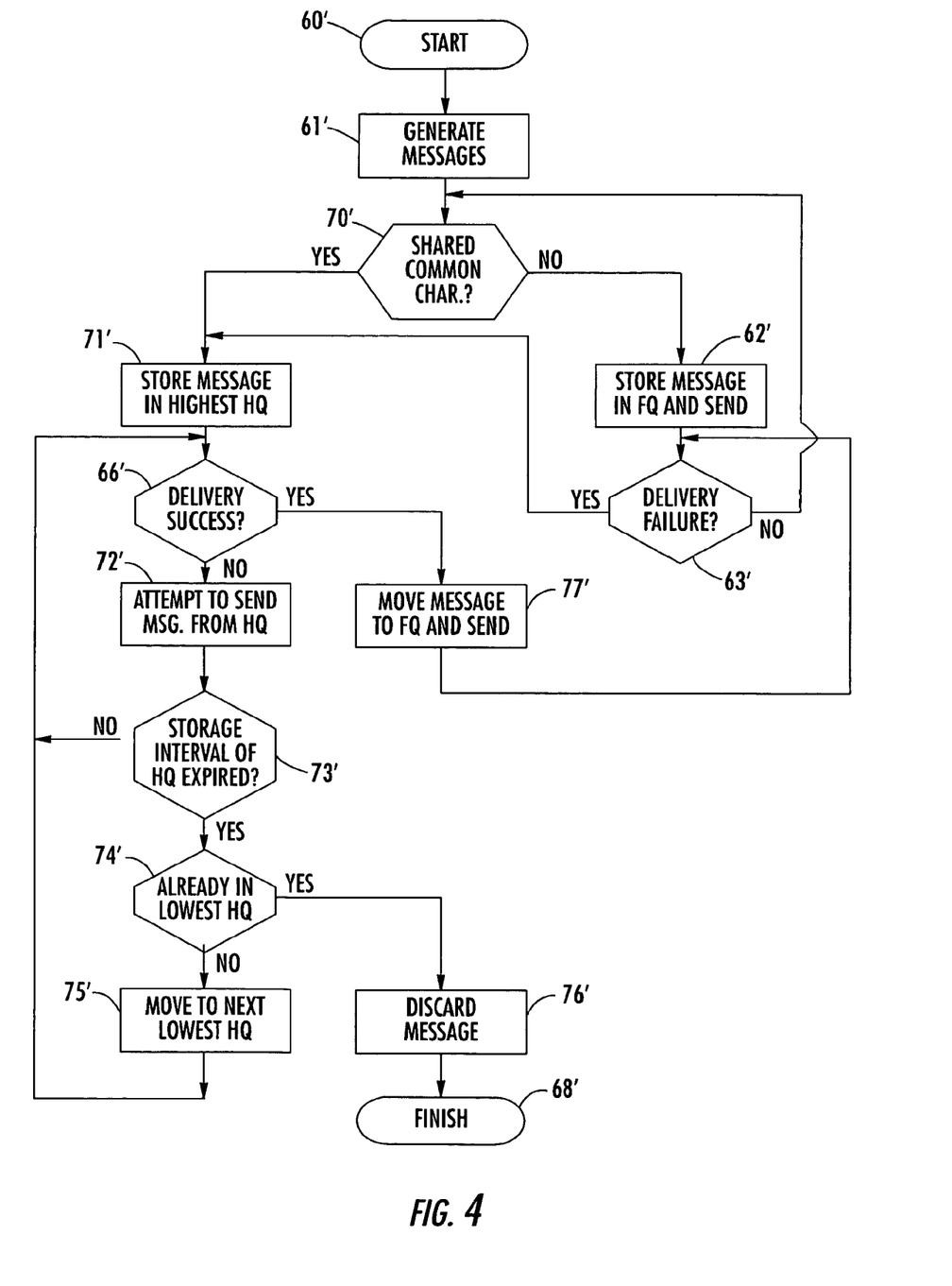
FIG. 4 is flow diagram illustrating an alternate embodiment of the email communications method of FIG. 3.

Turning additionally to FIG. 4, further method aspects of the invention which may be performed using the hierarchical second queue structure illustrated in FIG. 2 are now described. As noted above, the controller 30' may determine that a newly received email message has a common characteristic(s) with another message already stored in one of the hierarchical queues 32a'-32c', at Block 70'. If this is the case, the controller 30' stores the email message in the highest queue 32a' in the hierarchy, for example, at Block 71'.

If no successful delivery of another email message sharing a common characteristic occurs (Block 66'), the controller 30' attempts to send the messages from the queue 32a' during the storage interval thereof, at Blocks 72'-73'. The email messages are successively moved down the hierarchy of queues 32a'-32c' and the foregoing steps are repeated, until the lowest queue 32c' is reached and the storage interval thereof expires, at Blocks 74'-75', at which point the email messages are discarded (Block 76'). Of course, if at any point before discarding a successful delivery occurs, the stored message(s) sharing the common characteristic is moved to the first queue 31' and sent (Block 77') as described above.

Other advantageous aspects of the invention relate to a delivery server 26, such as the one described briefly above, and a related computer-readable medium for performing the steps described above with reference to FIGS. 3 and 4.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed:

1. A communications system comprising:
    at least one destination server configured to host a plurality of electronic mail (email) message boxes;
    a plurality of communications devices configured to generate email messages, each associated with a respective email message box; and
    a delivery server comprising a controller and a memory coupled thereto and configured to
        store email messages generated by the communications devices in a first queue,
        attempt to send the stored email messages to the at least one destination server at a first sending attempt rate,
        move email messages stored in the first queue to a second queue based upon a delivery failure, the second queue being one of a series of queues having respective different storage intervals,
        attempt to send email messages stored in the second queue to the at least one destination server at a second sending attempt rate less than the first sending attempt rate,
        move email messages from one queue to a next queue after being stored for the respective storage interval, and
    wherein the different storage intervals are independent of the first and second sending attempt rates.

2. The communications system of claim 1 wherein the delivery server is configured to:
    move email messages having a common characteristic with a successfully delivered email message to the first queue.

3. The communications system of claim 2 wherein the delivery failure is based upon a failure to deliver an email message to a respective email message box; and wherein the common characteristic comprises a common email message box.

4. The communications system of claim 2 wherein the at least one destination server comprises a plurality of destination servers; wherein the delivery failure is based upon a failure to deliver email messages to the at least one destination server; and wherein the common characteristic comprises having respective email message boxes hosted by a common destination server.

5. The communications system of claim 2 wherein the controller stores directly in the second queue email messages generated by the communications devices sharing the common characteristic with an email message already stored in the second queue.

6. The communications system of claim 1 wherein the controller attempts to send email messages from each of the queues at successively decreasing sending rates from a highest queue to a lowest queue.

7. The communications system of claim 1 wherein the controller discards email messages from a lowest queue after being stored therein for the respective storage interval.

8. The communications system of claim 1 wherein at least one of the plurality of communications devices comprises a wireless communications device.

9. The communications system of claim 1 further comprising a wide area network (WAN) connecting the at least one destination server and the delivery server.

10. A delivery server for delivering electronic mail (email) messages from a plurality of communications devices to at least one destination server hosting a plurality of email message boxes, each email message being associated with a respective email message box, the delivery server comprising:
    a controller and a memory coupled thereto and configured to
        store email messages generated by the communications devices in a first queue,
        attempt to send the stored email messages to the at least one destination server at a first sending attempt rate,
        move email messages stored in the first queue to a second queue based upon a delivery failure, the second queue being one of a series of queues having respective different storage intervals,
        attempt to send email messages stored in the second queue to the at least one destination server at a second sending attempt rate less than the first sending attempt rate,
        move email messages from one queue to a next queue after being stored for the respective storage interval, and
    wherein the different storage intervals are independent of the first and second sending attempt rates.

11. The communications system of claim 10 wherein the controller and memory are configured to:
    move email messages having a common characteristic with a successfully delivered email message to the first queue.

12. The delivery server of claim 11 wherein the delivery failure is based upon a failure to deliver an email message to a respective email message box; and wherein the common characteristic comprises a common email message box.

13. The delivery server of claim 11 wherein the at least one destination server comprises a plurality of destination servers; wherein the delivery failure is based upon a failure to deliver email messages to the at least one destination server;

and wherein the common characteristic comprises having respective email message boxes hosted by a common destination server.

14. The delivery server of claim 11 wherein the controller stores directly in the second queue email messages generated by the communications devices sharing the common characteristic with an email message already stored in the second queue.

15. The delivery server of claim 10 wherein the controller attempts to send email messages from each of the queues at successively decreasing sending rates from a highest queue to a lowest queue.

16. The delivery server of claim 10 wherein the controller discards email messages from a lowest queue after being stored therein for the respective storage interval.

17. A communications method for delivering electronic mail (email) messages from a plurality of communications devices to at least one destination server hosting a plurality of email message boxes, each email message being associated with a respective email message box, the method comprising:
storing email messages generated by the communications devices in a first queue;
attempting to send the stored email messages to the at least one destination server at a first sending attempt rate;
moving email messages stored in the first queue to a second queue based upon a delivery failure, the second queue being one of a series of queues having respective different storage intervals;
attempting to send email messages stored in the second queue to the at least one destination server at a second sending attempt rate less than the first sending attempt rate;
moving email messages from one queue to a next queue after being stored for the respective storage interval; and
wherein the different storage intervals are independent of the first and second sending attempt rates.

18. The method of claim 17 further comprising:
moving email messages having a common characteristic with a successfully delivered email message to the first queue.

19. The method of claim 18 wherein the delivery failure is based upon a failure to deliver an email message to a respective email message box; and wherein the common characteristic comprises a common email message box.

20. The method of claim 18 wherein the at least one destination server comprises a plurality of destination servers; wherein the delivery failure is based upon a failure to deliver email messages to the at least one destination server; and wherein the common characteristic comprises having respective email message boxes hosted by a common destination server.

21. The method of claim 18 further comprising storing directly in the second queue email messages generated by the communications devices sharing the common characteristic with an email message already stored in the second queue.

22. The method of claim 17 further comprising attempting to send email messages from each of the queues at successively decreasing sending rates from a highest queue to a lowest queue.

23. The method of claim 17 further comprising discarding email messages from a lowest queue after being stored therein for the respective storage interval.

* * * * *